Aug. 8, 1933.　　　　S. HERTZ ET AL　　　　1,921,880
STARTING APPARATUS FOR ROTARY ENGINES
Filed Oct. 16, 1931　　　　3 Sheets-Sheet 1
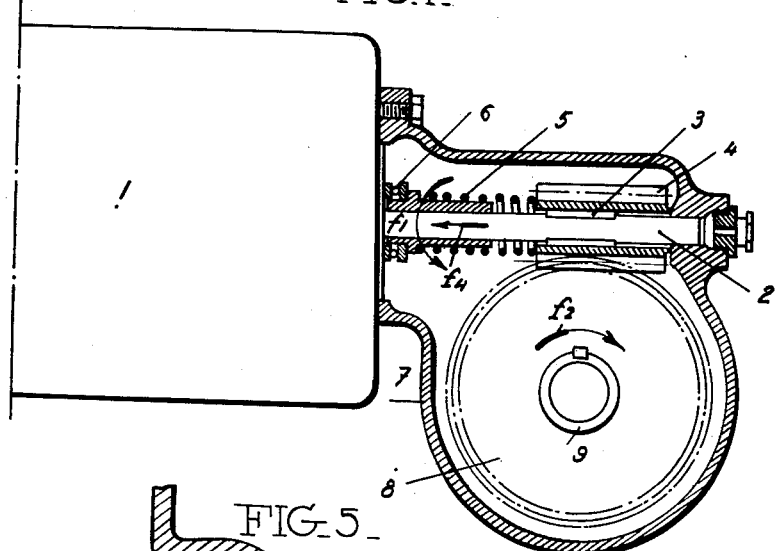
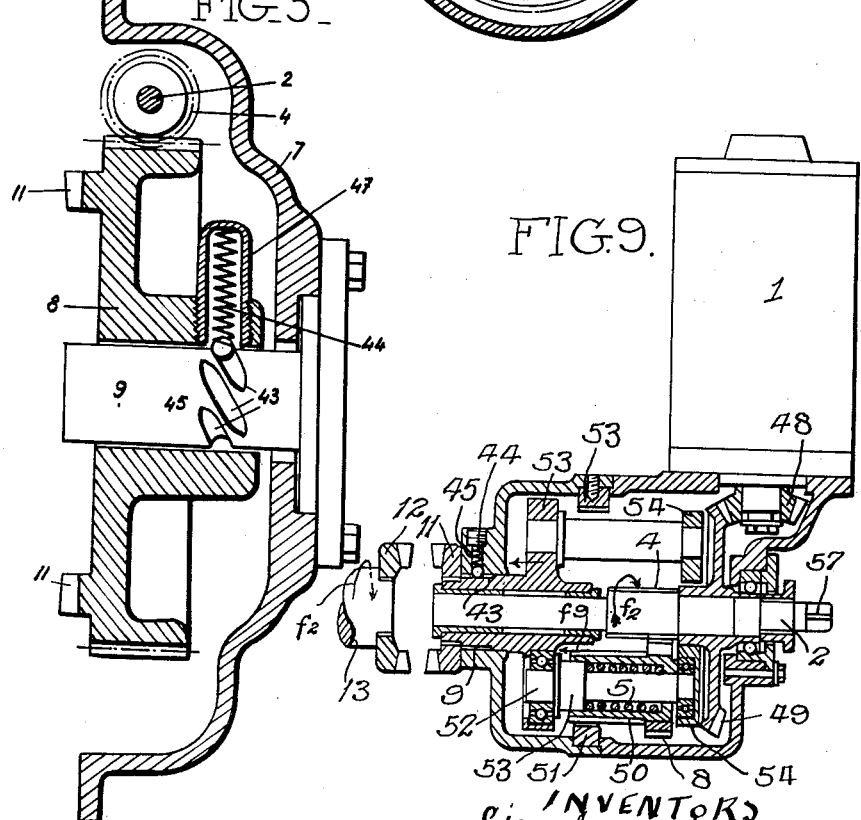

Aug. 8, 1933.    S. HERTZ ET AL    1,921,880
STARTING APPARATUS FOR ROTARY ENGINES
Filed Oct. 16, 1931    3 Sheets-Sheet 2
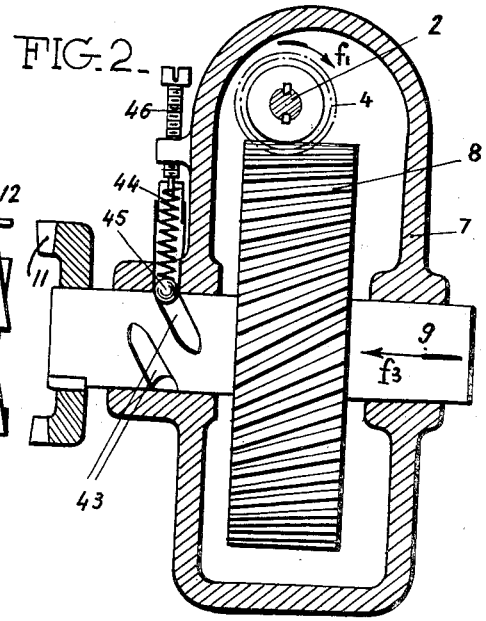
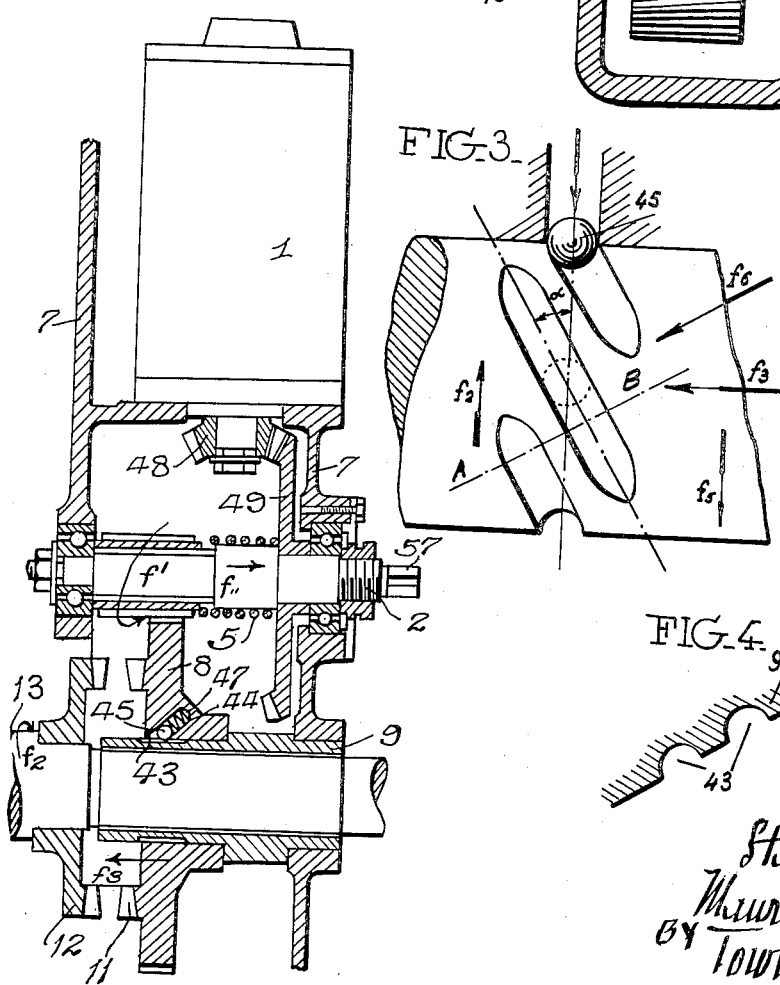
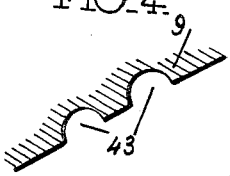

Aug. 8, 1933.     S. HERTZ ET AL     1,921,880
STARTING APPARATUS FOR ROTARY ENGINES
Filed Oct. 16, 1931     3 Sheets-Sheet 3
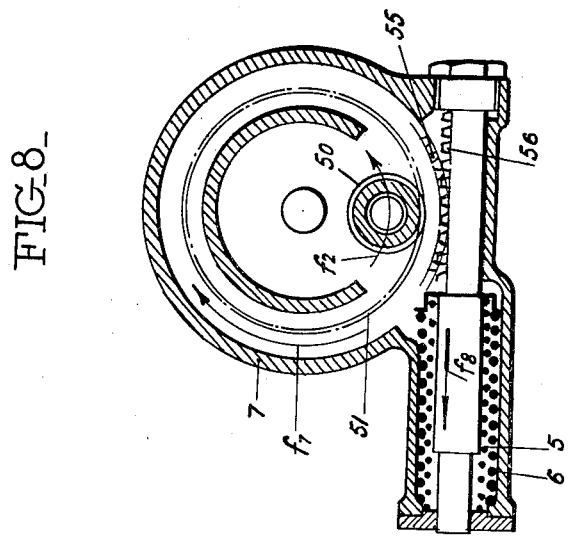
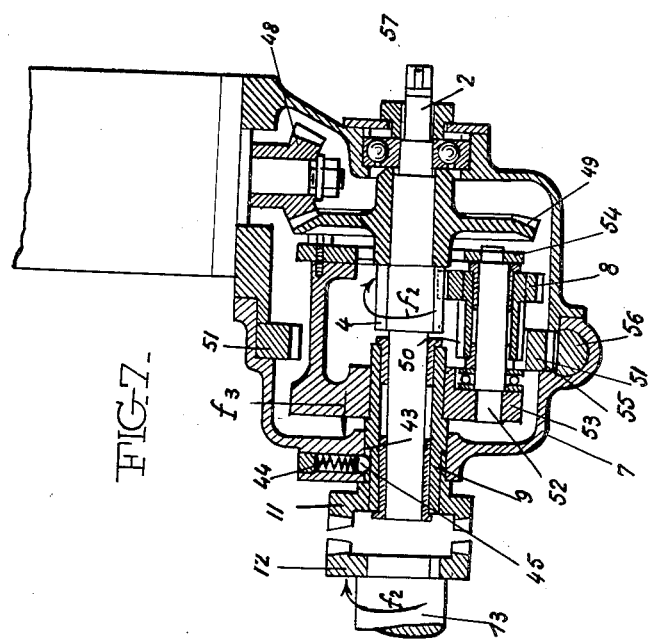

Patented Aug. 8, 1933

1,921,880

UNITED STATES PATENT OFFICE 1,921,880

STARTING APPARATUS FOR ROTARY ENGINES

Stanislas Hertz and Maurice Pierre Berger, Paris, France

Application October 16, 1931, Serial No. 569,228, and in France October 23, 1930

13 Claims. (Cl. 74—7)

This invention concerns an apparatus adapted for starting a rotary engine, more especially an explosion or internal combustion motor.

Said apparatus is based upon the well-known principle pursant to which gear members having helical teeth and a cylindrical periphery display the following tendencies: each gearwheel tends whilst revolving not only to cause the other gearwheel to turn but likewise to move it axially by the thrust of its teeth, whilst itself moving along its axis, provided the two gearwheels are so arranged as to render said axial movements possible.

The apparatus according to this invention comprises essentially two gearwheels having helical teeth in constant mesh, the first said wheel being driven by the starting motor and the second said wheel being integral with a member of a clutch adapted upon said starting motor being actuated, to carry with it the rotary machine which is to be started.

Said two gearwheels are axially movable by the relative thrusts of their respective teeth.

The gearwheel actuated by the starting motor, or driving wheel, moves along its axis against the opposition of a damping device such as a spring, for example.

The gearwheel integral with one of the clutch members, or driven wheel, is adapted so to move as to engage said member with the member integral with the engine to be started.

Said clutch comprises a pair of clutch members designed to operate in one direction only and to spring out of engagement automatically upon the rotary engine being started.

A spring loaded ball located opposite helical grooves is provided to prevent any undesired movements of the driven wheel due to vibrations, shocks or the like, when the starting device is not in use.

Said ball further cooperates with the reaction of the teeth to ensure the axial movement of the driven wheel.

In the accompanying drawings, which exemplifies a constructional embodiment of the invention without limiting the same, Fig. 1 is a section of the apparatus perpendicularly of the axis of the shaft of the engine to be started, Fig. 2 is a sectional elevation through the axis of the shaft of the engine to be started, Fig. 3 is a detail view, to an enlarged scale, of the shaft of the driven wheel together with the helical grooves of the same, Fig. 4 is a section on line A—B of Fig. 3, Fig. 5 is an alternative embodiment of Fig. 2, Fig. 6 is an alternative embodiment of Fig. 5, Fig. 7 is a sectional elevation through the axis of the shaft of the engine to be started in a further embodiment of the invention, Fig. 8 is a section perpendicular to the axis of the shaft of the engine to be started according to Fig. 7 and Fig. 9 is an alternative to Fig. 7.

1 denotes the electric or like starting motor adapted to carry in the direction of the arrow $f_1$ a shaft 2 which itself carries with it through keys 3 or the like a helical toothed gear 4 adapted to slide along shaft 2 against the opposition of a resilient member such as a coiled spring 5, the thrust being taken up by a ball stop 6.

One end of shaft 2 is journalled in a base 7, its other end being journalled either in starting motor 1 or in a member secured upon base 7.

Gear wheel 4 meshes with another gear wheel 8 having helical teeth, secured to a preferably tubular shaft 9 journalled in base 7.

Shaft 9 is adapted to move in the direction of arrow $f_3$, parallel with its axis of rotation, and carries a clutch disc secured to one of its ends having sloping teeth 11, said disc facing a clutch 12 secured to the shaft to be actuated 13, whose direction of rotation is shown by the arrow $f_2$.

The helix of gear wheels 4 and 8 has a left-hand pitch and that of the clutch members 11 and 12 has a right-hand pitch, for example.

Shaft 9 is provided with helically grooved portions 43 having a right-hand pitch, i. e. inversely directed to that of the teeth of wheel 8, and a ball 45 pressed by a spring 44 is adapted to enter said grooves, 46 being a set screw adapted to regulate the pressure of said spring upon said ball.

The device operates as follows:

Upon starting motor 1 being caused to revolve in the direction of arrow $f_1$, gear wheel 4 revolves in the direction of said arrow and causes gearwheel 8 and the shaft of the same to move in the direction of arrow $f_3$ until the two clutch plates 11, 12 come into contact, whilst gear wheel 8 simultaneously rotates in the direction of arrow $f_2$. Due to the inertia resistance of the engine to be started, said rotation slackens or stops as soon as clutch plates 11, 12 come into contact, but gearwheel 8 and shaft 9 of the same continue to move axially until said two clutch plates 11, 12 are fully engaged within each other.

Said axial movement of shaft 9 is assisted by the action of ball 45 in the helically grooved portion 43 until the two clutch plates 11, 12 begin to come into contact, when the ball 45 leaves the groove. Upon clutch members 11, 12 becoming fully engaged within each other, said ball rolls round the smooth portion of shaft 9.

The resistance of the motor to be started and the consequent resistance reaction of the teeth cause gearwheel 4 to move in the direction of arrow $f_4$, thereby compressing spring 5. When the reaction set up by the resistance of spring 5 is sufficient to overcome the inertia resistance of the motor to be started, having regard for the ratio of reduction between gearwheels 4, 8 of the output velocity of said gears, gearwheel 8 is restored to its full speed of rotation, carrying with it shaft 9 and clutch members 11, 12.

Since the inertia resistance of the motor to be started usually decreases as soon as it begins to rotate, spring 5 slackens and starting is facilitated.

When the motor is started, clutch plate 12 tends to revolve faster than clutch plate 11.

The effect of the special arrangement of the clutch and of the right-hand pitch of the teeth of clutch plate 12, for example, is to cause the latter to thrust clutch plate 11, shaft 9 and gear wheel 8 in a direction inverse to that of arrow $f_3$.

Upon starting motor 1 being now stopped, gear wheels 4 and 8 cease to revolve and gear wheel 8 strikes against base 7 or a member integral with the same.

During the recoil movement of gearwheel 8 and of shaft 9 ball 45 is subjected to considerable stress and is caused to jump out of grooves 43 whilst compressing spring 44 and ultimately comes to rest at the bottom of one of said grooves 43.

The starting device now being at rest, should outside action tend to cause shaft 9 to move outwards once more, ball 45 will prevent said movement since, in order to issue again in the direction of the arrow $f_3$ whilst gearwheel 4 is stationary, gearwheel 8 would have to revolve in the direction (Fig. 3) of arrow $f_5$ (opposed to that of $f_2$) owing to the inclination of the teeth of wheels 4 and 8. Shaft 9 would therefore be subjected to a stress directed according to arrow $f_6$ being a resultant of arrows $f_3$ and $f_5$. If care has been taken so to select the inclination of helical grooves 43 that the same is substantially perpendicular to $f_6$, ball 45 will be engaged by grooves 43 transversally of the latter in which case said ball cannot surmount the edge of said grooves owing to the weakness of the stresses due to outside influences such as inertia, vibrations and the like.

The shaft 9 has been designed hollow in order that a starting handle may be fitted axially within the same to start the engine by hand, in case the accumulators should be out of action, for example.

According to the alternative constructional embodiment shown in Fig. 5, helical wheel 8 is mounted idly upon stationary shaft 9 and carries the clutch plates 11, whilst shaft 9 still is provided with helically grooved portions 43 and ball 45 is contained within a socket 47 integral of wheel 8.

Said socket 47 may be inclined relatively to the axis 9 of wheel 8.

The helically grooved portions 43 might likewise be provided in the outside portion of the hub of wheel 8 and ball 45 be contained within the base 7.

The same general arrangement of parts is shown in Fig. 6 as in the previous figures and similar members bear the same reference numerals, but in the case of Fig. 6 shafts 2 and 9 are parallel with each other and motor 1 carries with it shaft 2 through a gearing 48—49 which may be bevelled.

At the end of shaft 2 is mounted a member which may be square 57, by means of which the motor may be started by hand if necessary, the benefit of the reduction of stress furnished by gearing 4—8 being thus secured.

Figs. 7 and 8 illustrate an alternative embodiment of the main device wherein use is made of epicyclic gears. Motor 1 drives shaft 2 by means of gearing 48—49 which may be bevelled. Shaft 2 is provided with helical teeth 4 meshing with one or more wheels 8 having helical teeth likewise, wheel 8 is integral with a straight spur wheel 50 meshing with the lower crown of teeth 51. Wheel 8 and spur wheel 50 constitute a unit journalled idly upon a shaft 52. Shaft or shafts 52 are stationary within a member 53—54 integral with tubular shaft 9. Said shaft 9 which is journalled in base 7 is concentric relatively to shaft 2 and may revolve around and slide upon the same.

Rim 51 is revoluble in base 7 and is provided with a toothed portion 55 meshing in a rack 56 adapted to slide against the pressure of springs 5.

The device operates as follows:

Upon the motor 1 being started, shaft 2 revolves in the direction of arrow $f_2$, gear wheel 4 revolves in the direction of said arrow and causes gearwheel 8, shaft 52, member 53—54 and shaft 9 to move in the direction of arrow $f_3$ until the two clutch plates 11, 12 come into engagement, the length of the toothed portion of the pinion or pinions 50 having been appropriately selected.

Simultaneously gear wheel 8 rotates to drive pinion 50 which, bearing against rim 51, causes member 53—54 and shaft 9 to revolve in the direction of arrow $f_2$.

The axial movement is assisted by the action of ball 45 within the helically grooved portion 43, as before.

The effect of the inertia resistance of the motor to be started and of the reaction between the teeth of pinion 50 and of rim 51 is to cause the latter to revolve in the direction of arrow $f_7$ and to move rack 56 in the direction of arrow $f_8$, said rack thereby compressing springs 5 which damp mechanical shocks and whose release facilitates starting.

The clutch plates 11—12, ball 45 and the helical grooves 43 thereafter serve the same purposes as in the previous examples.

The alternative shown in Fig. 9 is similar to the previous arrangement, excepting in regard to the location of damper springs 5.

Shaft or shafts 52 revolve in member 53—54 and rim 51 is integral with base 7, the unit constituted by helical wheel 8 and pinion 50 provided with straight teeth being adapted to slide upon shaft 52 in opposition to the pressure of spring 5.

The damper operates as follows:

The stress set up by the inertia of the motor to be started and the reaction obtaining between the teeth of members 4 and 8 cause the unit constituted by gear wheel 8 and pinion 50 to move, relatively to shaft 52, in the direction of arrow $f_9$ whilst compressing spring 5.

Said axial movement does not affect the meshing of pinion 50 with rim 51 since the teeth are straight. On the other hand, said axial movement causes gear wheel 8 to be offset angularly relatively to the teeth 4 of shaft 2 owing to the inclination of the teeth of wheels 4, 8, said angular offsetting of gearwheel 8 being in a direction opposite to that of its normal rotation and thereby causing momentary slackening in the rotation of hollow shaft 9, whereby mechanical shocks are absorbed.

The expansion of springs 5, on the other hand, accelerates the rotation of hollow shaft 9 and facilitates starting.

It will be noted that in the case of Fig. 9, wherein several toothed wheels such as 8 are mounted in member 53—54 and are simultaneously driven by helical wheel 4, the arrangement provided for transmitting motion between the latter and shaft 9 allows the drive to be taken up equally by all gear wheels 8 and pinions 50, provided that all of the springs 5 afford a resistance equal to the axial displacement of gear wheel 8 and of pinion 50 of the same at any given degree of compression, which cannot be the same in all cases. If the resistance opposed to one set 8, 50 is greater than that opposed to other similar sets of members, then unit 8, 50 would move backwards until the stresses are again equally distributed.

What we claim is:

1. A starting device comprising in combination, a gear wheel, a second gear wheel, said gear wheels having helical teeth constantly in mesh, the first said gear wheel driven by the starting motor being adapted to move axially, a damping device opposing axial movement of said first gear, a clutch member, the second said gear wheel being connected operatively with said member, a second clutch member connected operatively to the engine to be started, said clutch members adapted to act in one direction only, and to spring automatically out of clutching position upon the engine being started, and a spring actuated ball provided for preventing any undesired movement of said second gear wheel when the starting motor is out of use.

2. A starting device as claimed in claim 1, wherein the second gear wheel is slidably mounted upon a stationary shaft having helical grooves and carries the spring actuated ball and the interengaging clutch plates of the engine to be started.

3. A starting device as claimed in claim 1, wherein an epicyclic gear is provided between the first gear wheel and the clutch plates connected therewith, said epicyclic gear comprising the second gear wheel as a planet wheel, a crown wheel, a pinion integral with said planet second gear wheel having extended teeth and meshing in said crown wheel, said planet wheel being carried in a member integral with said clutch plates and being adapted to move axially and a revolving member operatively connected to the first clutch member, said revolving member carrying said planet wheel and both the planet wheel and pinion being axially movable.

4. A device as claimed in claim 1, wherein is provided a cylindrical part having helical grooves directed inversely of the pitch of the teeth of the second gear wheel and substantially perpendicularly to the component of movement of the part in which said helical grooves are provided with said spring actuated ball engaging said grooves when the clutch members are disengaged.

5. A device as claimed in claim 1, wherein a shaft is provided with helical grooves for engagement by said spring actuated ball when the clutch members are disengaged, said grooves extending into a cylindrical portion whereupon the ball bears and rides smoothly when the clutch members are engaged.

6. In a starting device for an engine, a starting motor, a shaft driven by said motor, a spiral gear wheel actuated by said shaft, a second spiral gear wheel permanently meshing with the first named spiral gear wheel and adapted to move axially, a one way clutch member operatively connected to the engine to be started, a cooperating one way clutch member operatively connected to and adapted to be slid simultaneously with said axially movable second mentioned spiral gear wheel for engaging and disengaging said clutch members, an axle for said second gear wheel, said axle having helical grooves provided on a part thereof, and a spring actuated ball cooperating with said grooves for facilitating axial movement of the said second gear wheel and the second mentioned clutch member.

7. In a starting device for an engine, a starting motor, a gear wheel associated therewith to be driven thereby, a second gear wheel permanently meshing with the first said gear wheel, and a clutch for connecting the second said gear wheel to the engine, both of said gear wheels being axially movable for facilitating operation of said clutch thereby.

8. In a starting device for an engine, a starting motor, a gear wheel associated therewith to be driven thereby, a second gear wheel permanently meshing with the first gear wheel, and a clutch for connecting the second said gear wheel to the engine, both of said gear wheels being axially movable for facilitating operation of said clutch thereby, and a spring for actuating one of said gears normally in one axial direction.

9. In a starting device for an engine, a starting motor, a shaft driven by said motor, a spiral gear wheel actuated by said shaft, a second spiral gear wheel permanently meshing with the first named spiral gear wheel and adapted to move axially, a one way clutch member operatively connected to the engine to be started, a cooperating one way clutch member operatively connected to and adapted to be slid simultaneously with said axially movable second mentioned spiral gear wheel for engaging and disengaging said clutch members, an axle for said second gear wheel, said axle having helical grooves provided on a part thereof a spring functioning in cooperation with rotation of said gear wheel for facilitating disengagement of said clutch members, and a spring actuated ball cooperating with said grooves for facilitating engagement of said clutch members.

10. In a starting device for an engine, a starting motor, a shaft driven by said motor, a gear wheel actuated by said shaft, a second gear wheel permanently meshing with the first named gear wheel and adapted to move axially, a one way clutch member operatively connected to the engine to be started, a cooperating one way clutch member operatively connected to and adapted to be slid simultaneously with said axially movable second mentioned gear wheel for engaging and disengaging said clutch members, an axle fast with respect to said second gear and rotatable therewith, said axle having helical grooves provided on a part thereof, bearings for said axle, and a spring actuated ball in one of said bearings cooperating with said grooves in the axle for effecting an axial movement of said axle by a rotation thereof.

11. In a starting device for an engine, a starting motor, a shaft driven by said motor, a gear wheel actuated by said shaft, a second gear wheel permanently meshing with the first named gear wheel and adapted to move axially, a one way clutch member operatively connected to the engine to be started, a cooperating one way clutch member operatively connected to and adapted to be slid simultaneously with said axially movable second mentioned gear wheel for engaging and disengaging said clutch members, a fixed axle both nonrotatable and longitudinally stationary, said axle having helical grooves provided on a part thereof, said second mentioned gear wheel and the cooperating clutch member being slidable and rotatable upon said axle and having a spring actuated ball opposite to and cooperating with said grooves in the axle for effecting an axial movement of said gear wheel and clutch member on said axle.

12. In a starting device for an engine, a rotatable cage, a toothed crown therearound, a shaft driven by the starting motor, a spiral gear wheel mounted on said shaft, a plurality of spiral gear wheels carried by said cage and permanently meshing with the first named spiral gear wheel, pinions integral with said second named spiral gear wheels and meshing with the teeth of said crown, an axle on which said second mentioned spiral gear wheels and pinions are freely rotatable and which is secured to said cage, a tubular shaft integral with said cage and slidably journaled, a one way clutch having one member integral with said tubular shaft and engaged by a longitudinal movement of this tubular shaft with the cooperating clutch member operatively connected to the engine to be started, and a resiliently mounted rack meshing with a toothed portion of said crown.

13. In a starting device for an engine, a rotatable cage, a fixed toothed crown therearound, a shaft driven by the starting motor, a spiral gear wheel mounted on said shaft, a plurality of spiral gear wheels carried by said cage and permanently meshing with the first named spiral gear wheel, pinions integral with said second named spiral gear wheels and meshing with the teeth of said crown, an axle on which said second mentioned spiral gear wheels and pinions are freely rotatable and slidable and which is secured to said cage; resilient means acting to oppose a sliding movement of said pinions and spiral gear wheels and a slidably journaled tubular shaft integral with said cage, a one way clutch having one member integral with said tubular shaft and engaged by a longitudinal movement of this tubular shaft with the cooperating clutch member operatively connected to the engine to be started.

STANISLAS HERTZ.
MAURICE PIERRE BERGER.